United States Patent
Kaito (10) Patent No.: US 8,492,037 B2
(45) Date of Patent: Jul. 23, 2013

(54) FUEL CELL SYSTEM HAVING WET-STATE DETERMINATION

(75) Inventor: Takahiro Kaito, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 813 days.

(21) Appl. No.: 12/304,931

(22) PCT Filed: Aug. 9, 2007

(86) PCT No.: PCT/IB2007/002305
§ 371 (c)(1),
(2), (4) Date: Dec. 15, 2008

(87) PCT Pub. No.: WO2008/017943
PCT Pub. Date: Feb. 14, 2008

(65) Prior Publication Data
US 2009/0258257 A1    Oct. 15, 2009

(30) Foreign Application Priority Data
Aug. 10, 2006  (JP) ................ 2006-218459

(51) Int. Cl.
*H01M 8/06*    (2006.01)
(52) U.S. Cl.
USPC ....................................... 429/428
(58) Field of Classification Search
USPC ................................. 429/431, 428
See application file for complete search history.

(56) References Cited

U.S. PATENT DOCUMENTS

| | | | |
|---|---|---|---|
| 6,524,733 B1 * | 2/2003 | Nonobe | 429/413 |
| 2003/0003330 A1 | 1/2003 | Ballantine et al. | |
| 2005/0053814 A1 * | 3/2005 | Imamura et al. | 429/22 |
| 2006/0166058 A1 | 7/2006 | Kudo | |

FOREIGN PATENT DOCUMENTS

| | | |
|---|---|---|
| JP | 2004-171993 A | 6/2004 |
| JP | 2005-100952 | 4/2005 |
| JP | 2005-141939 A | 6/2005 |
| JP | 2005-228688 | 8/2005 |
| JP | 2006-012466 A | 1/2006 |
| JP | 2006-156059 A | 6/2006 |

OTHER PUBLICATIONS

H. Görgün et al., "An algorithm for estimation of membrane water content in PEM fuel cells," Journal of Power Sources, Elsevier, Amsterdam, NL, vol. 157, No. 1, Jun. 19, 2006, pp. 389-394.

* cited by examiner

*Primary Examiner* — Kimberly Rizkallah
*Assistant Examiner* — Caleb Henry
(74) *Attorney, Agent, or Firm* — Drinker Biddle & Reath LLP (57) ABSTRACT

A fuel cell system includes a fuel cell stack A cell voltage detector detects a cell voltage at a cathode outlet-side of a single cell. A total voltage detector detects a total voltage of the fuel cell stack. A cell voltage difference computing unit determines an average cell voltage and a minimum cell voltage and computes a difference A stack current detector detects electric current. An anode outlet local current detector detects a local current. A current density-computing unit computes a stack current density and an anode outlet local current density. A wet state-judging unit judges a wet state of the fuel cell stack based on the difference between the average cell voltage and the minimum cell voltage, and based on the difference between the stack current density and the anode outlet local current density.

7 Claims, 13 Drawing Sheets

FUEL CELL SYSTEM HAVING WET-STATE DETERMINATION

CROSS-REFERENCE TO RELATED APPLICATIONS

This application claims priority to Japanese Patent Application No. 2006-218459, filed Aug. 10, 2006, the disclosure of which is incorporated by reference in its entirety.

BACKGROUND OF THE INVENTION

1. Field of the Invention

The present invention generally relates to fuel cell systems and particularly to a fuel cell system including a solid polymer electrolyte membrane.

2. Description of the Related Art

In an existing fuel cell system disclosed, for example, in Japanese Unexamined Patent Application Publication No. 2005-228688, in order to judge the wet state of proton-exchange membrane (PEM) fuel cells, operation conditions that affect loads on the fuel cell (e.g., the amount of air flow) are changed to decrease the amount of water in the fuel cell.

When the minimum cell voltage has exceeded a first predetermined value, it is judged that water-clogging has occurred.

In the existing fuel cell system, the cathode gas flow is increased to decrease the amount of water in the fuel cell.

SUMMARY OF THE INVENTION

However, such an operation is problematic in actual vehicle fuel cell systems because increasing the cathode gas flow without identifying whether the cell is dry or clogged with water will seriously impair reliability of the system. This is because it is possible that if the cathode gas flow is increased while the fuel cell is rather dry and the fuel cell voltage is low, then drying will rapidly proceed, thereby possibly leading to dry-outs.

In an embodiment, the invention provides a fuel cell system including a fuel cell stack having a plurality of single cells stacked on one another, each single cell including an anode to which fuel gas can be supplied, a cathode to which oxidizing gas can be supplied, and a solid polymer electrolyte membrane interposed between the anode and the cathode. The oxidizing gas and the fuel gas are configured for counter-flow with respect to each other. A cell voltage detector detects a cell voltage at a cathode outlet-side of a single cell. A total voltage detector detects a total voltage of the fuel cell stack. A cell voltage difference computing unit is configured to determine an average cell voltage from the total cell voltage detector and a minimum cell voltage from the cell voltage detector and to compute a difference between the average cell voltage and the minimum cell voltage. A stack current detector detects electric current in the fuel cell stack. An anode outlet local current detector detects a local current at an anode outlet-side of the fuel cell stack. A current density-computing unit is configured to compute a stack current density from the stack current detector and an anode outlet local current density from the anode outlet local current detector. A wet state-judging unit is configured to judge a wet state of the fuel cell stack based on the difference between the average cell voltage and the minimum cell voltage, and based on the difference between the stack current density and the anode outlet local current density.

In another embodiment, the invention provides a method for controlling a fuel cell stack including a plurality of single cells stacked on one another, each single cell including an anode to which fuel gas is supplied, a cathode to which oxidizing gas is supplied in counter-flow with respect to the fuel gas, and a solid polymer electrolyte membrane interposed between the anode and the cathode. The method includes detecting an average voltage of each single cell based on a total voltage of the fuel cell stack, detecting a minimum cell voltage based on a cell voltage at a cathode outlet side of a single cell, detecting a stack current density of the fuel cell stack, detecting an anode outlet local current density at an anode outlet side of the fuel cell stack, and judging a wet state of the fuel cell stack based on a difference between the average cell voltage and the minimum cell voltage, and a difference between the stack current density and the anode outlet local current density.

According to the present invention, the wetting state of the fuel cell can be accurately determined without degrading the reliability of the system.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DESCRIPTION OF THE PREFERRED EMBODIMENTS

When fuel cells are employed as power sources of automobiles, the humidifying system is simplified to minimize the size of the fuel cell system. The humidifying performance of the fuel cell system is sufficient at the designed operating point, however, under operation conditions beyond the designed operating point, e.g., at a temperature higher than the designed operating temperature, the solid polymer electrolyte membrane becomes dry (i.e. insufficiently wet). If the membrane is excessively dried, problematic holes will form in the membrane.

In contrast, when the operating temperature of the fuel cell stack is low, such as when the vehicle is started, the amount of water that can be taken out from the cathode or anode gas channel in the cell face is small, resulting in a high incidence of water-clogging (i.e. excessive wetting) in the cathode and anode channels. Moreover, even after the operation temperature is elevated to a sufficient level, the amount of water generated will increase correspondingly and water-clogging is prone to occur if the extraction load is high. This leads to low power-generating performance.

An object of the present invention is to appropriately determine the wet state of the fuel cell.

The configuration of the fuel cell system according to the present embodiment of the invention will now be described with reference to FIG. 1. This embodiment provides a fuel cell system suited for fuel cell vehicles, although the application is not so limited.

Figure 1:
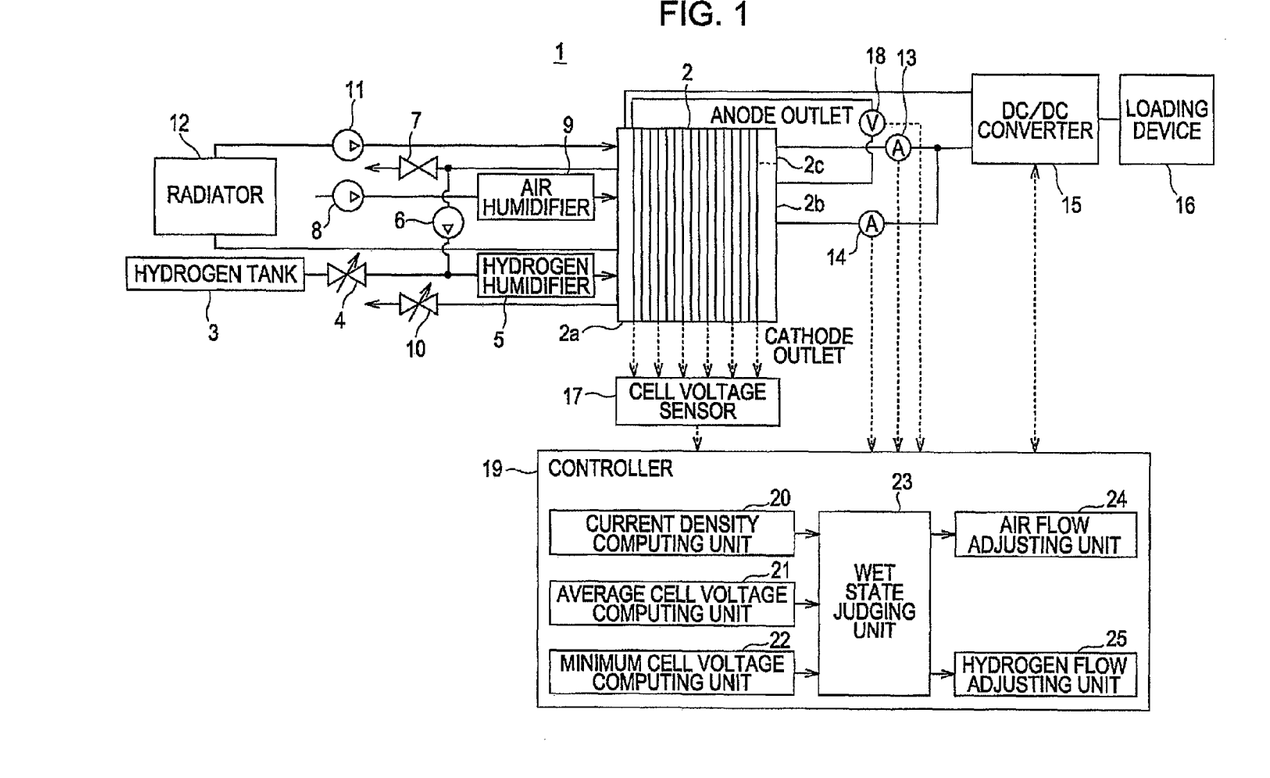
FIG. 1 is a system configuration diagram of a fuel cell system according to an embodiment of the invention.

Referring now to FIG. 1, a fuel cell system 1 of this embodiment includes a fuel cell stack 2 formed from stacked single cells, each cell including an anode to which hydrogen-containing fuel gas is supplied, a cathode to which oxidizing gas is supplied, and a solid polymer electrolyte interposed between the anode and the cathode. As for the fluid channel structure inside a single cell, air and a coolant supplied to the cathode flow in parallel to each other (i.e. parallel flow), and hydrogen supplied to the anode flows in a direction opposite to the flow of air and coolant (i.e. counter flow).

The fuel cell system 1 further includes a fuel gas supply system for supplying fuel gas, i.e., hydrogen, to the anode, an oxidizing gas supply system for supplying oxidizing gas, i.e., air, to the cathode, and a cooling system for supplying a coolant to the fuel cell system 1.

In this fuel cell system 1, electrochemical reaction schemes at the anode and the cathode are as follows:

Anode (fuel electrode): $H_2 \rightarrow 2H^+ + 2e^-$   Equation (1)

Cathode (oxidizing electrode): $2H^+ + 2e^- + 1/2O_2 \rightarrow H_2O$   Equation (2)

At the anode, hydrogen supplied is ionized into hydrogen ions and electrons, and the hydrogen ions migrate to the cathode through the electrolytic membrane. The electrons flow from the anode to the cathode through an external circuit (i.e. load). At the cathode, supplied oxygen, the hydrogen ions, and the electrons react to form water.

The fuel gas supply system includes a hydrogen tank 3 for storing high-pressure hydrogen gas; a hydrogen pressure control valve 4 for decreasing the pressure of the high-pressure hydrogen gas to an operating pressure of the fuel cell; a hydrogen humidifier 5 for humidifying hydrogen and supplying humidified hydrogen to the anode inlet of the fuel cell stack 2; a hydrogen circulation pump 6 for circulating, toward the upstream-side of the hydrogen humidifier 5, the unreacted anode gas, which is discharged from the anode outlet of the fuel cell stack 2; and a purge valve 7 for discharging the unreacted anode gas outside of the system. While a hydrogen tank is described in the instant embodiment, other hydrogen sources may be used. Examples of hydrogen sources usable in this fuel gas supply system other than the hydrogen tank include those sources that generate hydrogen by fuel reformation reaction of hydrocarbon-based raw materials, and fuels, such as propane gas, town gas, gasoline, alcohol, and the like. Hydrogen produced by water electrolysis using power from solar cells may also be used as the hydrogen source.

The oxidizing gas supply system includes a compressor 8 that in-takes air and compresses the in-take air; an air humidifier 9 that humidifies the compressed air and supplies the humidified compressed air to the cathode inlet of the fuel cell stack 2; and an air pressure control valve 10 that adjusts the air pressure at the cathode outlet of the fuel cell stack 2.

The coolant supply system is provided, for example, to supply an antifreeze containing water and a freezing point-depressing compound to the fuel cell stack 2. The coolant supply system includes a coolant pump 11 for pumping the coolant to a coolant inlet of the fuel cell stack 2, a radiator 12 that emits heat from the coolant to outside the system, and a cooling fan not shown in the drawing.

A cathode power collecting plate 2a of the fuel cell stack 2 is connected to a DC/DC converter 15 for retrieving power from the fuel cell stack. The anode-side power collecting plate of the fuel cell stack 2 is divided into an anode power collecting plate 2b, which collects power from regions other than the anode outlet region, and an anode outlet power collecting plate 2c for the measurement of the local electric current in the anode outlet region in the cell face. Such division of the anode-side power collecting plate eliminates the influence of the electric current flowing in the in-plane direction of the collecting plate, and thus the local electric current at the anode outlet can be accurately measured. The anode outlet power collecting plate 2c is connected to the DC/DC converter 15 through an anode outlet local current sensor 13, and the anode power collecting plate 2b is connected to the DC/DC converter 15 through a stack current sensor 14.

The voltage of power from the fuel cell stack 2 fluctuates according to the operating conditions and the magnitude of the load current. The DC/DC converter 15 converts the voltage of the power from the fuel cell stack 2 to a constant voltage and supplies the constant voltage to a loading device 16.

A cell voltage sensor 17 is a device for detecting the voltage of the cell and detects, at the cathode outlet, the voltage of each single cell of the fuel cell stack 2, or the voltage of each cell group including a plurality of single cells connected in series.

Figure 2:
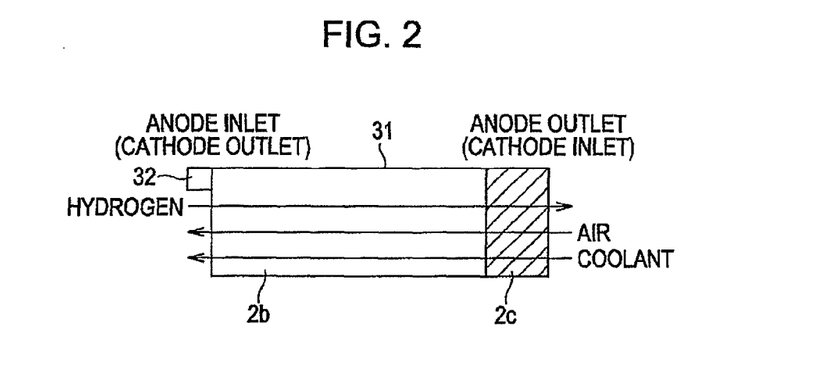
FIG. 2 is a diagram showing the direction of fluid flow in a cell face, a position at which the cell voltage is measured, and the manner in which an anode-side power collecting plate is divided.

FIG. 2 is a schematic diagram showing the directions of flow of hydrogen, air, and coolant in a power-generating face 31 of a single cell. The diagram also shows a cell voltage measuring position 32 at which the cell voltage is measured with the cell voltage sensor 17 and how the anode-side power collecting plate is divided into the anode outlet power collecting plate 2c and the anode power collecting plate 2b.

Referring again to FIG. 1, a total voltage sensor 18 is a device that detects the stack voltage (i.e. total voltage) of the fuel cell stack 2.

A controller 19 that controls the fuel cell system 1 functions as a device for computing the stack current density and the anode outlet local current density, and as a device for judging the wet state of the fuel cell stack 2.

The controller 19 includes a current density-computing unit 20 that computes the stack current density and the anode outlet local current density on the basis of the values detected by the stack current sensor 14 and the anode outlet local current sensor 13; an average cell voltage-computing unit 21 that computes the average cell voltage on the basis of the stack voltage detected by the total voltage sensor 18; a minimum cell voltage-computing unit 22 that computes the minimum cell voltage on the basis of the voltage of each cell or cell group detected by the cell voltage sensor 17; a wet state-judging unit 23 that judges the wet state of the fuel cell stack 2 on the basis of the stack current density, the anode outlet local current density, the average cell voltage, and the minimum cell voltage; an air flow-adjusting unit 24 that adjusts the air flow rate supplied to the cathode on the basis of the judgment of the wet state-judging unit 23; and a hydrogen flow-adjusting unit 25 that adjusts the hydrogen flow rate supplied to the anode.

The current density-computing unit 20 stores in advance a stack effective area Ss, which is the effective area for current collection in the anode power collecting plate 2b, and an anode outlet effective area Sa, which is the effective area for current collection in the anode outlet power collecting plate 2c. The current density-computing unit 20 computes a stack current density Dis by dividing the value observed at the stack current sensor 14 by the stack effective area Ss, and computes an anode outlet local current density Dia by dividing the value observed at the anode outlet local current sensor 13 by the anode outlet effective area Sa.

The average cell voltage computing unit 21 computes the average cell voltage by dividing the stack total voltage detected at the total voltage sensor 18 by the number n of cells included in the stack.

The minimum cell voltage-computing unit 22 computes the minimum cell voltage in the stack on the basis of the voltage of each single cell or the voltage of each cell group formed from a plurality of single cells connected in series, detected by the cell voltage sensor 17. When the cell voltage sensor 17 is configured to detect the voltage of each single cell, the minimum value of the voltage is computed for each single cell. When the cell voltage sensor 17 is configured to detect the voltage of each cell group, the cell voltage of each cell in the cell group is computed by dividing the detected value of the cell group by the number of cells included in the cell group and the minimum value among all cell voltages in the stack is determined as the minimum cell voltage. When the cell voltage sensor 17 is configured to detect the cell group voltage, the minimum unit of the cell voltage resolution is the cell group and thus the actual minimum cell voltage is not detected; however, the above-described voltage is assumed to be the minimum cell voltage for the sake of convenience.

The wet state-judging unit 23 judges the wet state of the fuel cell stack 2 on the basis of the difference between the average cell voltage and the minimum cell voltage and the comparative examination of the stack current density and the anode outlet local current density. Details of the wet state of the fuel cell stack 2 judged by the wet state-judging unit 23 are described below with reference to FIGS. 3-5.

The air flow-adjusting unit 24 controls the compressor 8 and the purge valve 7 such that the air flow supplied to the cathode is increased when the wet state-judging unit 23 judges that water-clogging has occurred in the cathode. The air flow-adjusting unit 24 also controls the compressor 8 the purge valve 7 such that the air flow supplied to the cathode is decreased when the wet state-judging unit 23 judges that the cathode is dry.

The hydrogen flow-adjusting unit 25 controls the hydrogen circulation pump 6 such that the hydrogen flow supplied to the anode is increased when the wet state-judging unit 23 judges that water-clogging has occurred in the anode.

In this embodiment, the controller 19 is a microprocessor including a central processing unit (CPU), a program ROM, a working RAM, and an I/O interface.

Figure 3:
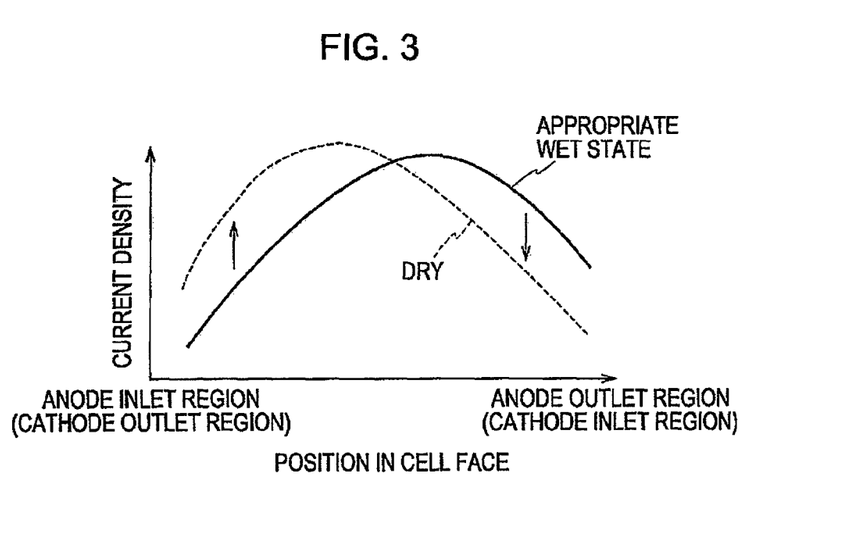
FIG. 3 is a graph showing a current density distribution in the cell face during drying.
Figure 4:
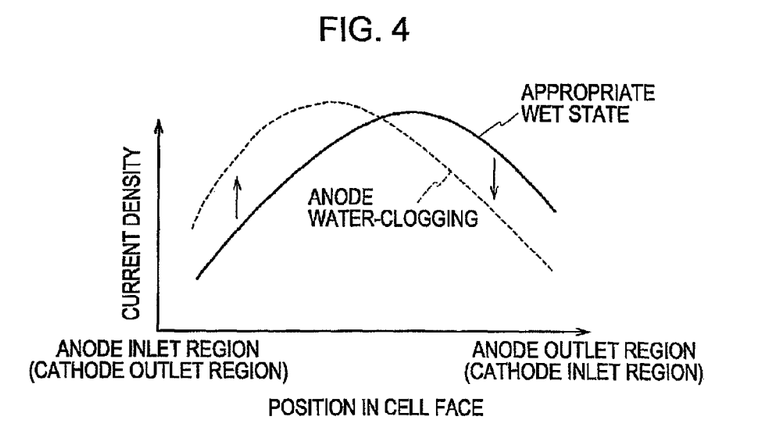
FIG. 4 is a graph showing a current density distribution in the cell face during anode water clogging.
Figure 5:
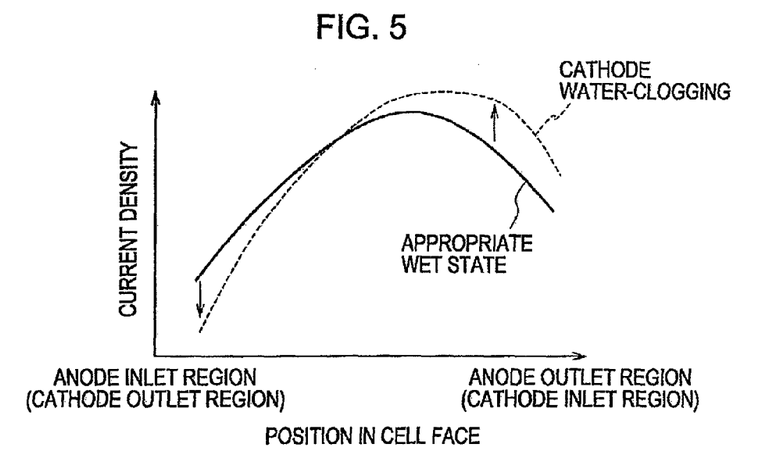
FIG. 5 is a graph showing a current density distribution in the cell face during cathode water clogging.

Referring now to FIGS. 3-5, changes in current density distribution in the cell face during drying, anode water-clogging, and cathode water-clogging when the fuel cell system has a cell channel flow structure in which air and the coolant flow in parallel with each other, and hydrogen flows in a direction opposite to the air and coolant flow, will be described.

The current density distribution in the cell face when the fuel cell stack is dry is described with reference to FIG. 3. At the cathode inlet region, the cathode gas with a relative humidity of less than 100% is fed, and thus the cathode inlet region is the driest region. If the cathode gas flow rate is increased from this state, the cathode inlet becomes even drier, resulting in decreases in power-generating performance and local current density. In order to compensate for such decreases, the current density increases at the cathode outlet side (i.e., the anode inlet side) where the degree of wetting is relatively high.

The current density distribution in the cell face when the anode of the fuel cell stack is clogged with water will now be described with reference to FIG. 4. When water-clogging occurs in the anode channel, hydrogen deficiency occurs at the anode outlet side, resulting in decreased power generating performance, i.e., current density, at the anode outlet side. Since this decrease is compensated by increasing the power generating performance at the anode inlet side, the current density increases at the anode inlet side (i.e., the cathode outlet side).

The current density distribution in the cell face when the cathode of the fuel cell stack is clogged with water will now be described with reference to FIG. 5. When water-clogging occurs in the cathode channel, oxygen deficiency occurs at the cathode outlet side, resulting in decreased power generating performance, i.e., current density, at the cathode outlet side. Since this decrease is compensated by increasing the power generating performance at the cathode inlet side, the current density increases at the cathode inlet side.

Accordingly, whether the fuel cell stack is dry or has the anode clogged with water cannot be distinguished by merely detecting change in current density in the cell face (i.e., decrease in current density at the anode outlet side). Thus, in this embodiment, a cell voltage sensor is provided at the cathode outlet side to additionally judge whether the difference between the average cell voltage computed from the stack total voltage and the minimum cell voltage computed from the voltage of each cell or each cell group detected at the cell voltage sensor is equal to or greater than a predetermined value. In other words, when the current density at the anode outlet side is decreased, the state is judged as "dry" if the difference between the average cell voltage and the minimum cell voltage is equal to or greater than a predetermined value or higher. In this case, if the difference between the average cell voltage and the minimum cell voltage is less than the predetermined value, then a judgment of anode water-clogging is rendered.

Figure 6:
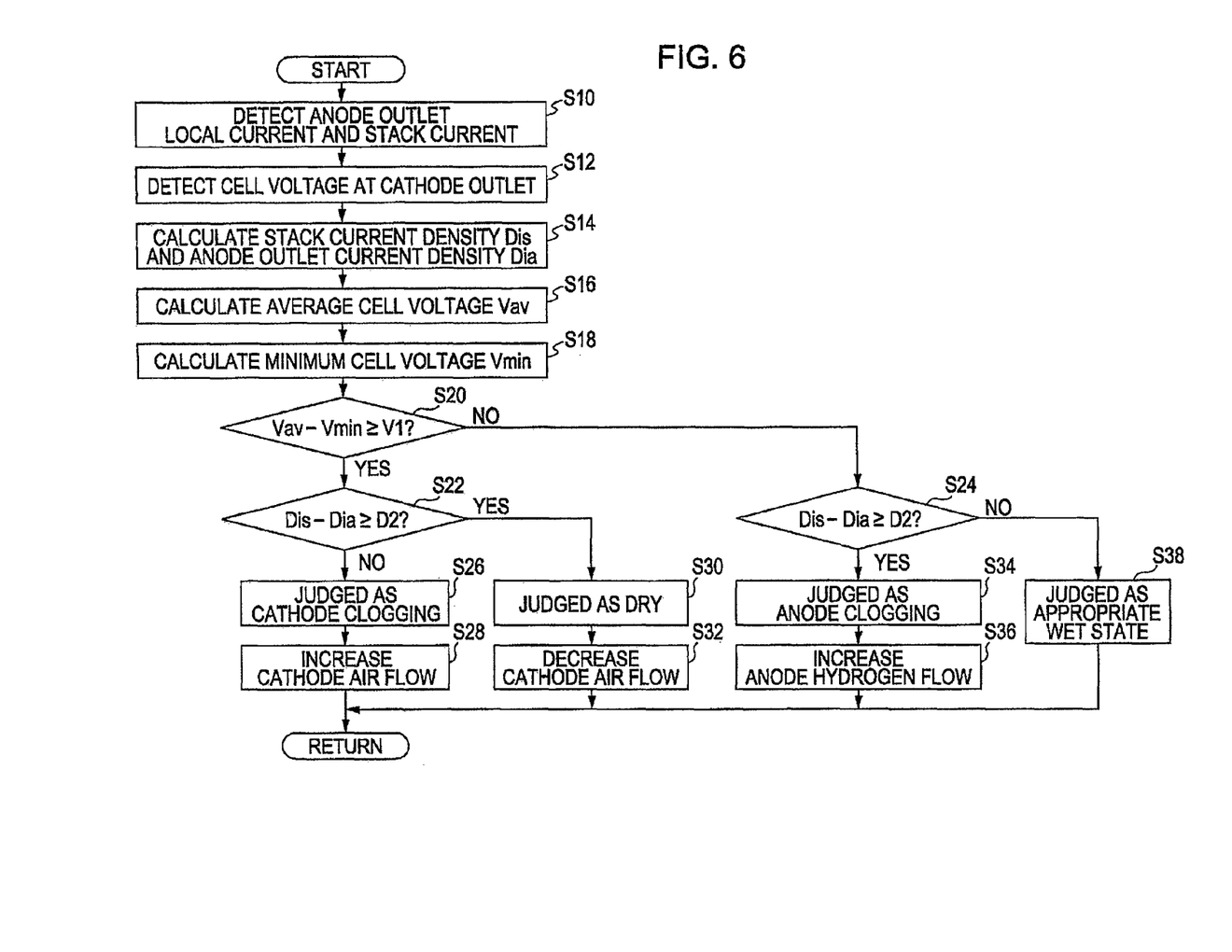
FIG. 6 is a control flowchart for judging the wet state according to an embodiment of the invention.

Referring now to the control flowchart of FIG. 6 and time charts in FIGS. 7-15, the judgment of the wetting state of the fuel cell system of this embodiment by the controller 19 is described in detail. In the control flowchart of FIG. 6, a first condition for judging the wetting state is first tested, and then a second condition for judging the wetting state is tested.

Figure 7:
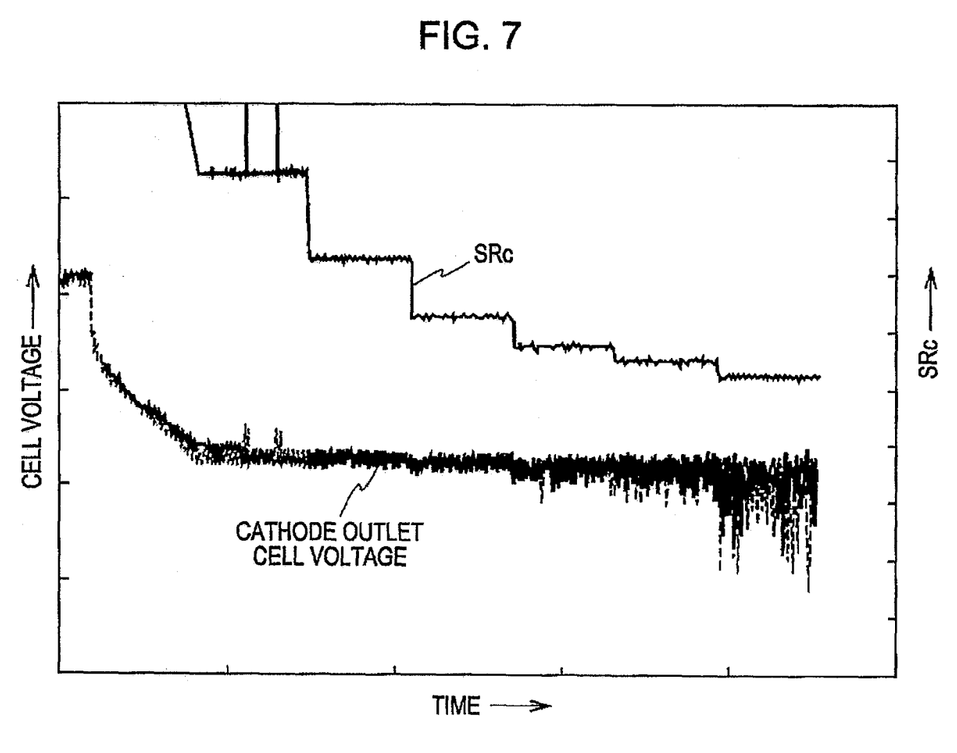
FIG. 7 is a time chart showing a decrease in cathode outlet cell voltage during cathode water clogging.

The cathode water-clogging state will now be described with reference to FIG. 7. In FIG. 7, the cathode stoichiometric ratio (i.e. ratio of the oxygen flow supplied to the cathode to the oxygen flow converted from the generating current according to electrochemical reaction scheme described in equation (2)) SRc is decreased stepwise with the passage of time. When the air flow supplied to the cathode is decreased as a result, the cell voltage at the cathode outlet fluctuates after reaching a particular flow, and the cell voltage in some cells is significantly dropped. This phenomenon is cathode water-clogging. Due to the decreased air flow in the cathode, it becomes difficult to discharge water from the cathode and water stays inside the cathode. As a result, the supply of oxygen from air to the cathode catalyst becomes deficient and power-generating performance is degraded. The cell voltage will partially recover if the water stored in the cathode is discharged.

Figure 8:
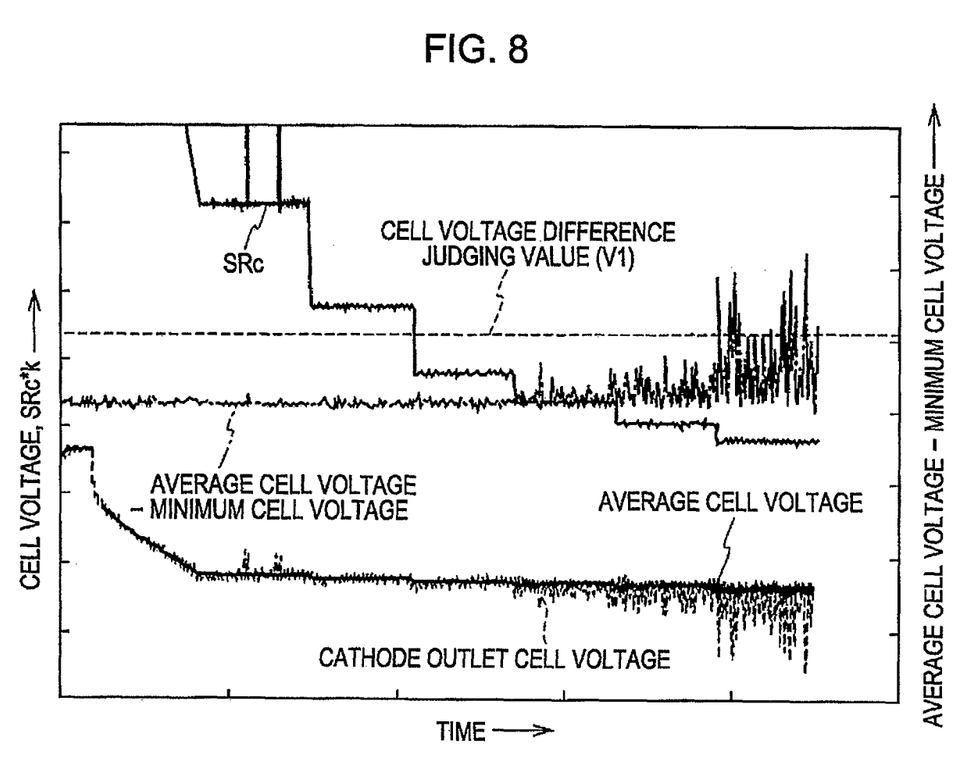
FIG. 8 is a time chart showing the difference between an average cell voltage and a minimum cell voltage during cathode water clogging.

Referring now to FIG. 8, a judgment I of the wetting state is described. In FIG. 8, if the cathode stoichiometric ratio SRc is decreased and the air flow supplied to the cathode is decreased, cathode water-clogging occurs and the average cell voltage and the minimum voltage decrease gradually. However, the degree of decrease is larger for the minimum cell voltage than that for the average cell voltage. Thus, the difference between the average cell voltage and the minimum cell voltage gradually increases. When the air flow supplied to the cathode is decreased to a certain level, the difference between the average cell voltage and the minimum cell voltage exceeds a first predetermined value, which is a cell voltage difference judging value (V1). Accordingly, "YES" is determined for the first condition for judging the wet state.

The cell voltage difference judging value (V1), i.e., the first predetermined value, is determined by experimentally determining the difference between the average cell voltage and the minimum cell voltage, at which cathode clogging or drying occurs and problems in operating the fuel cell stack 2 start, and then setting a value smaller than this difference to be the cell voltage difference judging value (V1) for safety considerations. The cell voltage difference judging value (V1) is preliminarily input to the controller 19.

Figure 9:
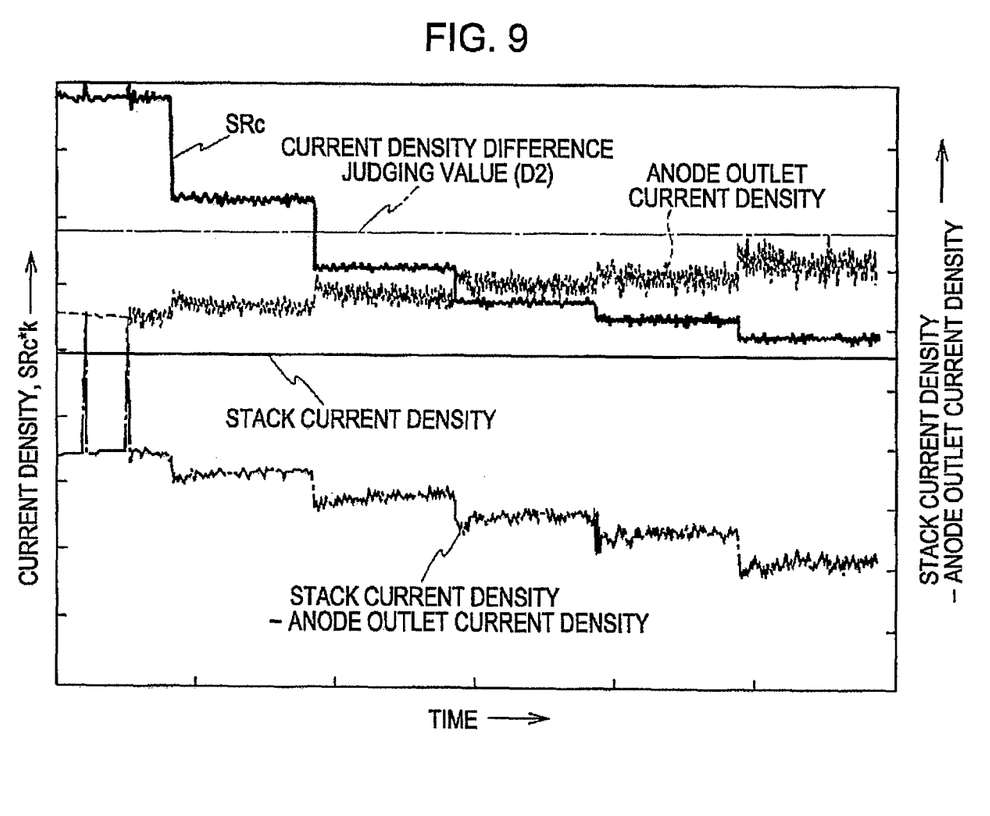
FIG. 9 is a time chart showing the difference between a fuel cell stack average current density and an anode outlet local current density during cathode water clogging.

Referring now to FIGS. 5 and 9, a judgment 2 of the wetting state is described. As shown in FIG. 9, when the cathode stoichiometric ratio SRc is decreased and the air flow supplied to the cathode is decreased, cathode clogging occurs. The clogging often occurs at the cathode outlet. Thus, the current density at the cathode outlet gradually decreases, as shown in FIG. 5. As a result, the current density in other regions in the cell face, including the vicinity of the anode outlet, is increased. Thus, as shown in FIG. 9, the difference between the fuel cell stack current density and the anode outlet local current density becomes gradually small, and the difference never exceeds the current density difference judging value (D2), which is a second predetermined value. In such a case, NO is determined for the judgment 2, and cathode water clogging is determined.

The current density difference judging value (D2) is determined by experimentally determining the difference between the fuel cell stack current density and the anode outlet local current density at which water-clogging of the anode of the fuel cell stack 2 occurs and problems in the operation of the fuel cell stack 2 start, and then setting a value smaller than this difference to be the current density difference judging value (D2) for safety considerations. The current density difference judging value (D2) is input to the controller 19 in advance.

Figure 10:
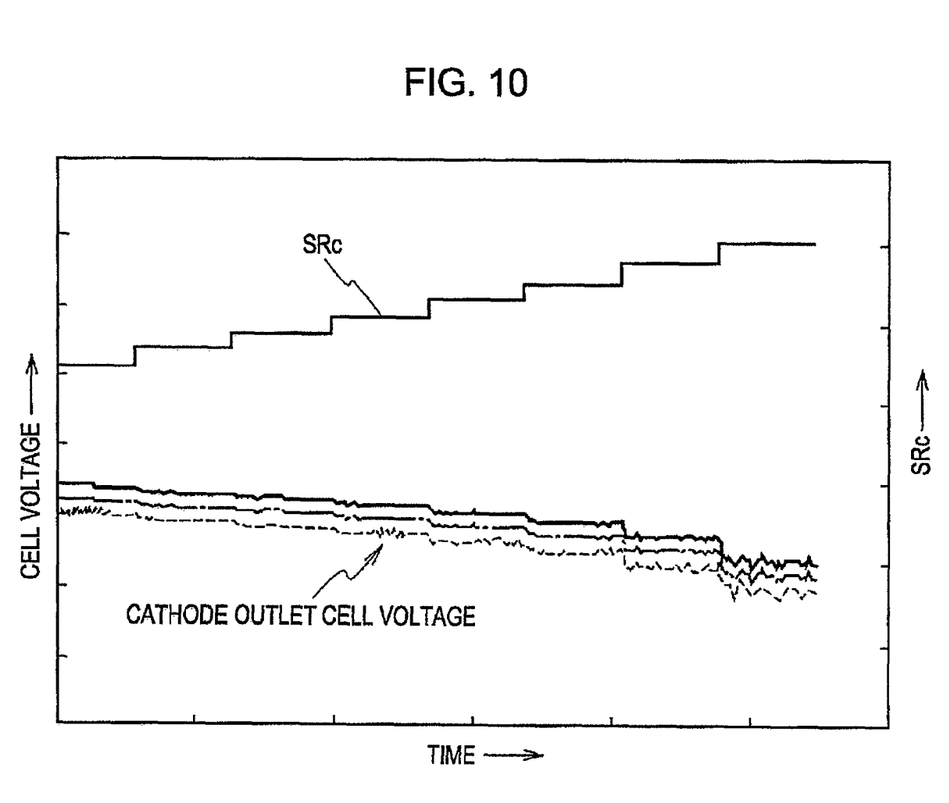
FIG. 10 is a time chart showing a decrease in cathode outlet cell voltage during drying.
Figure 11:
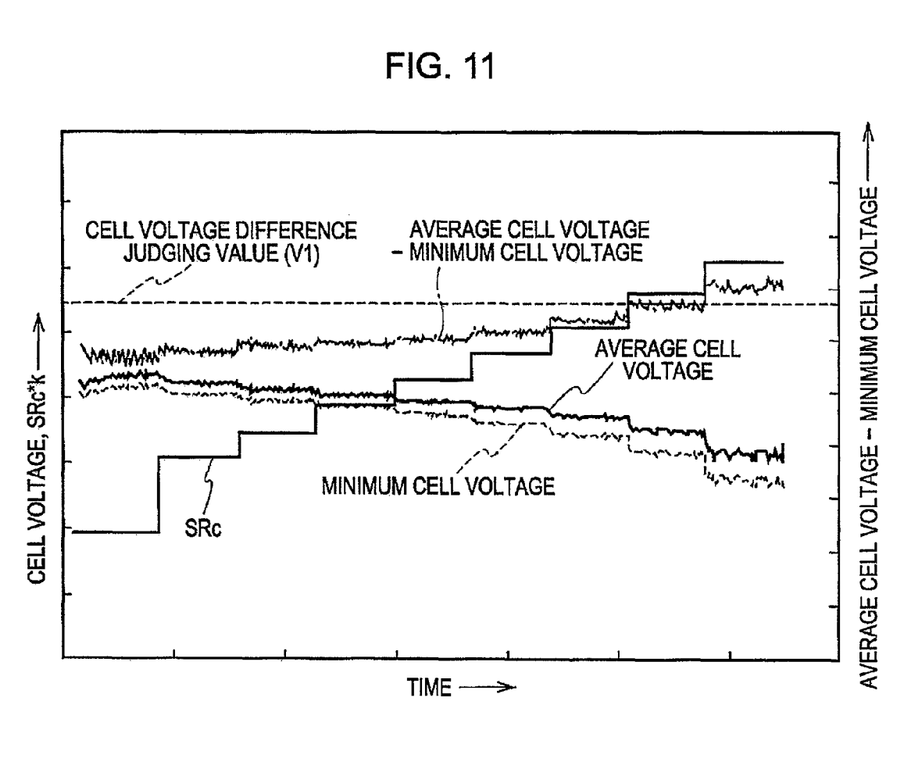
FIG. 11 is a time chart showing the difference between an average cell voltage and a minimum cell voltage during drying.

Referring now to FIG. 3 and FIGS. 10-12, the cases in which the stack is judged as dry are described. As shown in FIG. 10, when the cathode stoichiometric ratio SRc is increased and the air flow supplied to the cathode is increased, the amount of water from the fuel cell stack is increased. Thus, the electrolytic membrane becomes dry, the hydrogen ion conductivity is decreased, and the resistance polarization increases. Thus, the cell voltage at the cathode outlet decreases. Moreover, as shown in FIG. 11, when the cathode stoichiometric ratio SRc is increased and the air flow supplied to the cathode is increased, the average cell voltage and the minimum cell voltage are both decreased. However, since the degree of decrease is larger for the minimum cell voltage than for the average cell voltage, the difference between the average cell voltage and the minimum cell voltage gradually increases. When the cathode gas flow is increased to a certain level, the difference between the average cell voltage and the minimum cell voltage exceeds the cell voltage difference judging value (V1), which is the first predetermined value. Thus, YES is determined for the first condition for judging the wet state.

Figure 12:
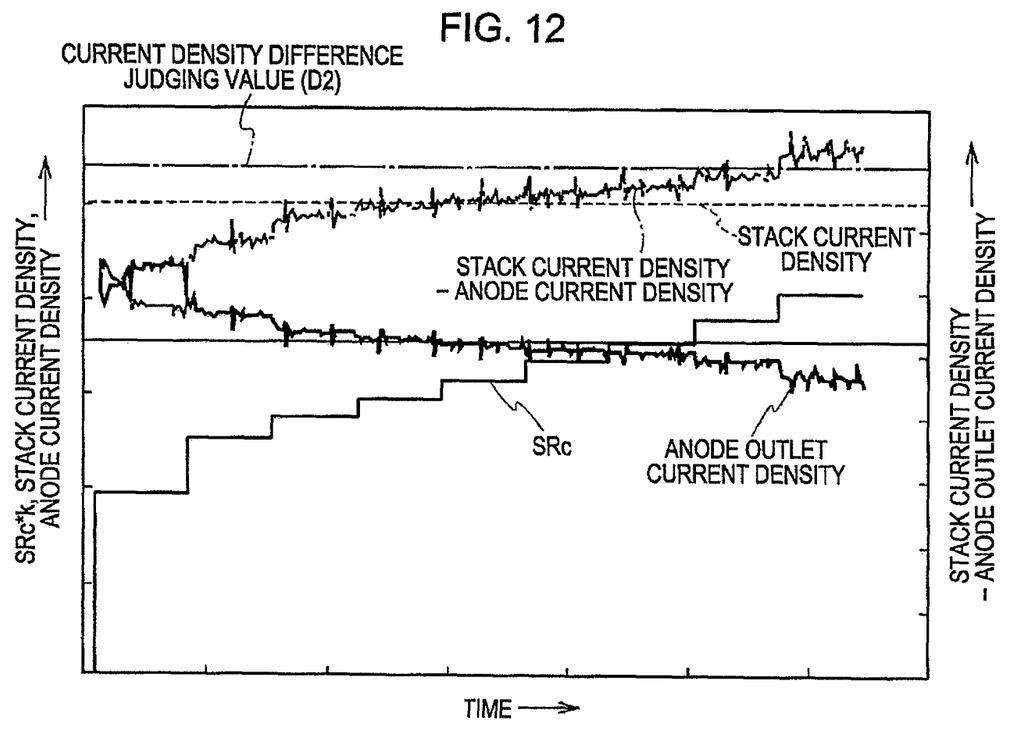
FIG. 12 is a time chart showing the difference between a fuel cell stack average current density and an anode outlet current density during drying.

As described above with reference to FIG. 3, the cathode inlet (anode outlet) is the driest region. Thus, as shown in FIG. 12, the cathode inlet (anode outlet) local current density gradually decreases, and the difference between the fuel cell stack current density and the anode outlet local current density gradually increases. When the cathode air flow reaches a certain level, the difference between the fuel cell stack current density and the anode outlet local current density exceeds a second predetermined value, i.e., the current density judging value (D2). Thus, YES is determined for the second condition for judging the wet state, and the stack is thus judged as dry.

Figure 13:
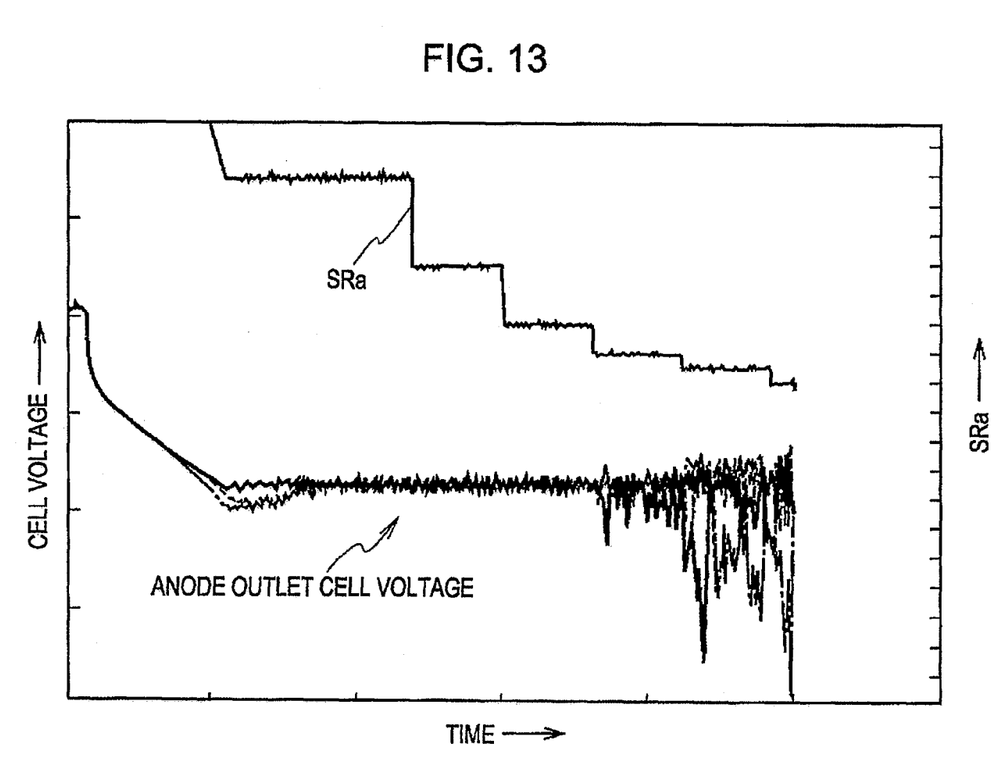
FIG. 13 is a time chart showing a decrease in cathode outlet cell voltage during anode water clogging.

Referring now to FIG. 4 and FIGS. 13 to 15, the cases in which water-clogging of the anode is determined are described. Referring to FIG. 13, when the anode stoichiometric ratio (i.e. ratio of the hydrogen flow supplied to the anode to the hydrogen flow converted from the generating power according to the electrochemical reaction scheme described in equation (1)) SRa is decreased stepwise with the passage of time so that the hydrogen flow supplied to the anode is decreased, the rate of anode gas flow at the cell outlet decreases. Thus, water that has been generated in the cathode and diffused back into the anode channel cannot be pushed out to the exterior of the cell, and the anode becomes clogged with water, resulting in a decrease in cell voltage at the anode outlet.

Figure 14:
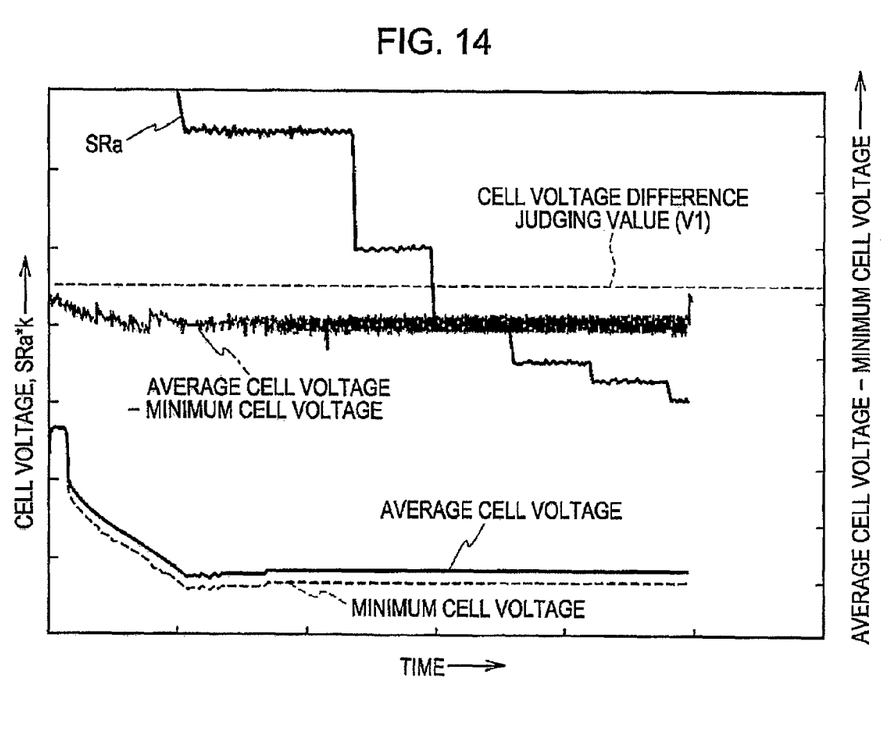
FIG. 14 is a time chart showing the difference between an average cell voltage and a minimum cell voltage during anode water clogging.

However, since anode clogging does not substantially affect the voltage at the anode inlet, i.e., the cathode outlet, the value detected by the cell voltage sensor 17, which detects the cell voltage at the cathode outlet, does not show substantial changes. As shown in FIG. 14, no substantial change is observed in the difference between the average cell voltage and the minimum cell voltage at the cathode outlet. Thus, the difference between the average cell voltage and the minimum cell voltage does not exceed the cell voltage difference judging value (V1), which is the first predetermined value, and NO is determined for the first condition for judging the wet state.

Figure 15:
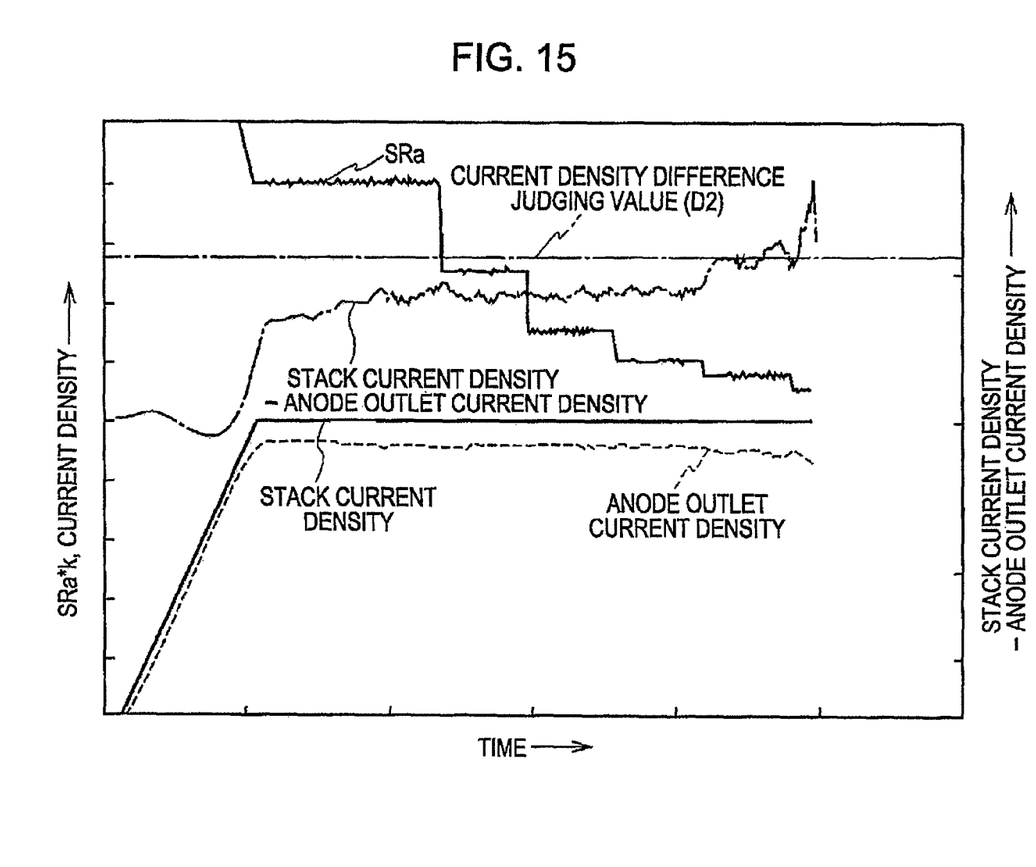
FIG. 15 is a time chart showing the difference between a fuel cell stack average current density and an anode outlet current density during anode water clogging.

Changes in current density at the cathode inlet (anode outlet) during anode water-clogging will now be described with reference to FIG. 15. When water-clogging occurs at the anode channel outlet, the power generating performance decreases at the anode channel outlet and the local current density at the anode outlet decreases. The difference between the stack current density and the anode outlet current density increases as the anode gas flow decreases. When a certain level of flow is reached, the difference exceeds the current density difference judging value (D2), which is the second predetermined value, and YES is determined for the second condition for judging the wet state. Thus, the stack is judged as having anode water-clogging.

When the stack is judged as being in an appropriate wet state, no voltage decrease is observed at the cathode outlet and NO is determined for the first condition for judging the wet state. Since the current density at the anode outlet is also appropriate, NO is determined for the second condition for judging the wet state. The stack is finally judged as being in an appropriate wet state.

The control flowchart of FIG. 6 will now be described on the basis of the first and second conditions for judging the wet state described above. The control flowchart is executed by an internal program of the controller 19 shown in FIG. 1, and is configured as a subroutine called every predetermined length of time from the main routine. Note that although the first condition is judged first and the second condition next in FIG. 6, the result remains the same if this order is reversed.

Referring now to FIG. 6, in step (simply referred to as "S" hereinafter) 10, an anode outlet local current value Ia detected by the anode outlet local current sensor 13 and a stack current value Is detected by the stack current sensor 14 are uploaded to the controller 19. In S12, the values detected by the total voltage sensor 18 that detects the total voltage of the fuel cell stack 2 and the cell voltage sensor 17 that detects the voltage of each cell or each cell group are uploaded to the controller 19. Instead of the value detected by the total voltage sensor 18, the total of voltage values detected by the cell voltage sensor 17 for each cell or each cell group may be used as the stack total voltage.

Next, in S14, a stack effective area Ss and the anode outlet effective area Sa previously stored in the controller 19 are used to calculate the stack current density Dis, which is equal to Is/Ss, and the anode outlet current density Dia, which is equal to Ia/Sa.

Next, in S16, the stack total voltage is divided by a total number of cells n in the fuel cell stack 2 to determine an average cell voltage Vav. In S18, the minimum cell voltage Vmin is calculated on the basis of the cell voltage.

In S20, the first condition for judging the wet state is examined. The first judging condition is provided to judge whether the difference between the average cell voltage Vav and the minimum cell voltage Vmin is equal to or greater than the first predetermined value, i.e., cell voltage difference judging value (V1). If Vav−Vmin ≧V1 in S20, then the program judges that either cathode water-clogging or drying is occurring and proceeds to S22. If Vav−Vmin <V1 in S20, then the program judges that either the anode is clogged with water or the stack is in an appropriate wet state and proceeds to S24.

In S22, the second condition for judging the wet state is examined by judging whether the difference between the stack current density Dis and the anode outlet current density Dia is equal to or greater than the second predetermined value, i.e. current density difference judging value (D2). In the examination of the second judging condition, if Dis− Dia<D2 in S22, then the program proceeds to S26. If Dis− Dia≧D2 in S22, then the program proceeds to S30.

In S26, the program determines that the cathode is clogged with water and proceeds to S28. In S28, the rotating speed of the compressor 8 is increased, or the air pressure control valve 10 opening is increased to increase the cathode air flow. Then the program returns to the main routine.

In S30, the fuel cell stack 2 is judged as dry, and the program proceeds to S32. In S32, the rotating speed of the compressor 8 is decreased and the air pressure control valve 10 opening is decreased to decrease the cathode air flow. Then the program returns to the main routine.

In S24, the second condition for judging the wet state is examined. In particular, whether the difference between the stack current density Dis and the anode outlet current density Dia is equal to or greater than the second predetermined value, i.e. current density difference judging value (D2), is determined. In S24, if Dis−Dia ≧D2, then the program proceeds to S34. If Dis−Dia <D2 in S24, then the program proceeds to S38.

In S34, anode water-clogging is determined and the program proceeds to S36. In S36, the rotation speed of the hydrogen circulation pump 6 is increased, the purge valve 7 is opened, or, if the purge valve 7 is already open, the opening of the purge valve 7 is increased to increase the anode hydrogen flow. Then the program returns to the main routine. In S38, the stack is judged as being in an appropriate wet state and the program simply returns to the main routine.

The process described above can be reworded as follows.

If drying (i.e. insufficient wetting) occurs in a particular cell in the fuel cell stack 2, then the voltage of that particular cell decreases and becomes the minimum cell voltage in the stack.

With respect to the flow of the fluids in the fuel cells, a structure is arranged such that the oxidizing gas and the fuel gas flow in opposing directions to thereby form a counter-flow. When water-clogging occurs at the cathode side in the cell, the cathode outlet side. downstream of the cathode gas is affected most by the water generated. Thus, the cathode gas at the cathode outlet region (i.e. anode inlet region) in the cell face becomes deficient, and the current density in that region becomes lower than that in an appropriate wet state. Furthermore, when the anode side of the cell is clogged with water, the anode outlet region downstream of the anode gas is affected most by the water generated. Thus, the anode gas at the anode outlet region (i.e. cathode inlet region) in the cell face becomes deficient, and the current density in that region becomes lower than that in the appropriate wet state.

Based on the understanding above, a cell voltage sensor for detecting the cell voltage is disposed at the cathode outlet-side so that whether the difference between the average cell voltage and the minimum cell voltage is equal to or greater than the first predetermined value (i.e. first condition) can be examined. If the first condition is satisfied, then it can be determined that either the stack is dry or water-clogging has occurred in the anode. If the first condition is not satisfied, then it can be determined that either the stack is in an appropriate wet state or water-clogging has occurred at the anode side.

Furthermore, the stack current sensor for detecting the stack current and a local current sensor for detecting the local current at the anode outlet side are provided. The stack current density can be computed from the detection of the stack current and the anode outlet current density can be computed from the detection of the anode outlet local current. Then, the second condition, i.e., whether the difference between the stack current density and the anode outlet current density is equal to or greater than the second predetermined value determined for each stack current density, is determined.

When the first condition is satisfied but the second condition is unsatisfied, it can be determined that the water-clogging has occurred at the cathode side. When both the first and second conditions are satisfied, it can be determined that the stack is dry.

When the first condition is unsatisfied but the second condition is satisfied, it can be determined that water-clogging has occurred at the anode side. When neither the first condition nor the second condition is satisfied, it can be determined that the stack is in an appropriate wet state.

According to the embodiment described above, the wet state is determined without changing the operation conditions that change the amount of water in the fuel cell or using the lower threshold value of the current density or lower threshold value of the cell voltage. Instead, the wet state is determined on the basis of the difference between the current density of the fuel cell stack and the local current density at the anode outlet, and the difference between the fuel cell stack average cell voltage and the minimum cell voltage. Thus, the wetting state of the fuel cell system can be accurately judged even when the system is applied to automobile fuel cell systems where load fluctuation is large, and the reliability of the system can thus be enhanced.

Note that although the anode outlet local current is detected in the embodiment described above, such detection is equivalent to detection of the cathode outlet local current. Furthermore, although the cathode outlet-side voltage is detected in the above embodiment, such detection is equivalent to detection of the anode inlet-side voltage.

The embodiment can also be practiced without particularly defining the direction of flow of the coolant. However, the accuracy of detection can be further improved if the coolant flows parallel to the oxidizing gas, i.e., opposite to the fuel gas.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A fuel cell system comprising:
    a fuel cell stack including a plurality of single cells stacked on one another, each single cell including an anode to which fuel gas can be supplied, a cathode to which oxidizing gas can be supplied, and a solid polymer electrolyte membrane interposed between the anode and the cathode, the oxidizing gas and the fuel gas configured for counter-flow with respect to each other, the anode being divided into an anode outlet power collecting plate for measurement of local electric current at an anode-outlet side and an anode power collecting plate that collects power from regions other than the anode-outlet side;
    a cell voltage detector that detects a cell voltage at a cathode outlet-side of a single cell;
    a total voltage detector that detects a total voltage of the fuel cell stack;
    a cell voltage difference computing unit configured to determine an average cell voltage from the total cell voltage detector and a minimum cell voltage from the cell voltage detector and to compute a difference between the average cell voltage and the minimum cell voltage;
    a stack current detector that detects electric current in the fuel cell stack;
    an anode outlet local current detector that detects a local current at an anode outlet-side of the fuel cell stack;
    a current density-computing unit configured to compute a stack current density from the stack current detector and an anode outlet local current density from the anode outlet local current detector; and
    a wet state-judging unit configured to judge a wet state of the fuel cell stack based on the difference between the average cell voltage and the minimum cell voltage, and based on the difference between the stack current density and the anode outlet local current density,
    wherein the wet state judging unit is configured to judge that the anode is clogged with water if the difference between the average cell voltage and the minimum cell voltage is less than a first predetermined value and the difference between the stack current density and the anode outlet local current density is equal to or greater than a second predetermined value, and
    wherein the current density-computing unit is configured to store a stack effective area and an anode outlet effective area.

2. The fuel cell system according to claim 1, wherein the wet state-judging unit is configured to judge that the cathode is clogged with water if the difference between the average cell voltage and the minimum cell voltage is equal to or greater than a first predetermined value, and the difference between the stack current density and the anode outlet local current density is less than a second predetermined value.

3. The fuel cell system according to claim 2, further comprising:
    an oxidizing gas flow-adjusting unit that adjusts the oxidizing gas flow supplied to the cathode; and
    a controller configured to control the flow of the oxidizing gas flow-adjusting unit, wherein the controller increases the oxidizing gas flow supplied to the cathode when the wet state judging unit determines that the cathode is clogged with water.

4. The fuel cell system according to claim 1, wherein the wet state-judging unit is configured to determine that the fuel cell stack is dry when the difference between the average cell voltage and the minimum cell voltage is equal to or greater than a first predetermined value, and the difference between the stack current density and the anode outlet local current density is equal to or greater than a second predetermined value.

5. The fuel cell system according to claim 4, further comprising:
    an oxidizing gas flow-adjusting unit that adjusts the oxidizing gas flow supplied to the cathode; and
    a controller configured to control the flow of the oxidizing gas flow-adjusting unit, wherein the controller decreases the oxidizing gas flow supplied to the cathode when the wet state-judging unit determines that the fuel cell stack is dry.

6. The fuel cell system according to claim 1, further comprising:
    a fuel gas flow-adjusting unit that adjusts the fuel gas flow supplied to the anode; and
    a controller configured to control the flow in the fuel gas flow-adjusting unit, wherein the controller increases the fuel gas flow supplied to the anode when the wet state-judging unit judges that the anode is clogged with water.

7. The fuel cell system according to claim 1, wherein each of the plurality of single cells further includes a cooling channel in which a cooling medium can flow in parallel to the oxidizing gas.

* * * * *